US009975427B2

United States Patent
Hisatsugu (10) Patent No.: US 9,975,427 B2
(45) Date of Patent: May 22, 2018

(54) VEHICLE USER INTERFACE SYSTEM INDICATING OPERATIONS OF AN OPERATION PART OF A VEHICLE

(71) Applicant: DENSO CORPORATION, Kariya, Aichi-pref. (JP)

(72) Inventor: Shinsuke Hisatsugu, Kariya (JP)

(73) Assignee: DENSO CORPORATION, Kariya (JP)

( * ) Notice: Subject to any disclaimer, the term of this patent is extended or adjusted under 35 U.S.C. 154(b) by 986 days.

(21) Appl. No.: 14/258,586

(22) Filed: Apr. 22, 2014

(65) Prior Publication Data
US 2015/0033174 A1    Jan. 29, 2015

(30) Foreign Application Priority Data
Jul. 25, 2013  (JP) ................. 2013-154608

(51) Int. Cl.
*B60K 35/00*  (2006.01)
*B60K 37/06*  (2006.01)

(52) U.S. Cl.
CPC .............. *B60K 35/00* (2013.01); *B60K 37/06* (2013.01)

(58) Field of Classification Search
None
See application file for complete search history.

(56) References Cited

U.S. PATENT DOCUMENTS

| | | | | |
|---|---|---|---|---|
| 6,587,131 B1* | 7/2003 | Nakai | ................. | G06F 3/04812 715/857 |
| 2005/0031100 A1* | 2/2005 | Iggulden | ............. | B60R 16/0231 379/102.03 |
| 2008/0163129 A1* | 7/2008 | Lee | ........................ | G06F 1/1626 715/859 |
| 2009/0140845 A1* | 6/2009 | Hioki | ..................... | B60K 35/00 340/425.5 |
| 2010/0302022 A1* | 12/2010 | Saban | .................... | B60N 2/002 340/459 |
| 2011/0082627 A1* | 4/2011 | Small | ..................... | B60K 35/00 701/48 |
| 2012/0194420 A1* | 8/2012 | Osterhout | .......... | G02B 27/0093 345/156 |

(Continued)

FOREIGN PATENT DOCUMENTS

| | | |
|---|---|---|
| JP | 09-315129 A | 9/1997 |
| JP | 2004-102843 A | 4/2004 |

(Continued)

*Primary Examiner* — Kevin L Young
*Assistant Examiner* — F J Farhadian
(74) *Attorney, Agent, or Firm* — Posz Law Group, PLC (57) ABSTRACT

A vehicle user interface system including an operation device, a display device, and a control device, is provided. The operation device is positioned at a position where a driver operates, and inputting multiple operations. The display device displays a display image with using a windshield. The control device controls the display device to display multiple icons, which are selectable by operating the operation device. In a case where a selected icon, which has been selected among the multiple icons displayed by the display device, is distinguishably displayed, the control device controls the display device to display an operation display image and the selected icon. The operation display image indicates one of the multiple operations to which a processing is assigned among the multiple operations.

10 Claims, 7 Drawing Sheets

(56) References Cited

U.S. PATENT DOCUMENTS

| | | | |
|---|---|---|---|
| 2013/0097557 A1 | 4/2013 | Madau et al. | |
| 2013/0215021 A1* | 8/2013 | Morikawa | G06F 3/041 345/157 |
| 2013/0293452 A1* | 11/2013 | Ricci | G02B 27/01 345/156 |
| 2013/0335301 A1* | 12/2013 | Wong | G02B 27/0093 345/8 |
| 2014/0320200 A1* | 10/2014 | Dohi | H03K 17/962 327/517 |
| 2015/0002212 A1* | 1/2015 | Dohi | H03K 17/9622 327/517 |

FOREIGN PATENT DOCUMENTS

| | | | | |
|---|---|---|---|---|
| JP | 2004-262437 A | | 9/2004 | |
| JP | 2011-051427 A | | 3/2011 | |
| JP | 2011051427 A | * | 3/2011 | ............ B60R 16/02 |
| JP | 2011-193040 A | | 9/2011 | |

\* cited by examiner

VEHICLE WIDTH DIRN

VEHICLE USER INTERFACE SYSTEM INDICATING OPERATIONS OF AN OPERATION PART OF A VEHICLE

CROSS REFERENCE TO RELATED APPLICATION

This application is based on Japanese Patent Application No, 2013-154608 filed on Jul. 25, 2013 the disclosure of which is incorporated herein by reference,

TECHNICAL FIELD

The present disclosure relates to a vehicle user interface.

BACKGROUND

Patent document 1: JP-A-2011-51427

Recently, a vehicle includes various operation apparatuses (e.g., in-vehicle electric apparatuses) operated by a driver in a vehicle. Various operation apparatuses correspond to an air-conditioner, an audio apparatus, or the like. Usually, this type of the operation apparatuses has a dedicated operation portion and a display portion. Therefore, as the number of the operation apparatuses mounted to the vehicle increases, or as the number of functions of each of the operation apparatuses increases, a load required for operation may increase.

A configuration in which multiple operation apparatuses are operated using a common operation portion and a common display portion is proposed (referring to Patent document 1). In a configuration described in Patent documents 1, a display device (i.e., a display portion) is provided in an upper part of a center console, which is provided between a driver's seat and a passenger seat, and a multiple operation switch (i.e., an operation portion) is provided in a lower part of the center console.

The applicant of the present invention has found the following with respect to a vehicle user interface.

Even if the configuration described in Patent document 1 is used, in a case where a driver operates the operation portion, the driver turns one's eyes on the display portion from a driving visual field. Therefore, the load to the driver when an operation is performed may be reduced more.

SUMMARY

It is an object of the present disclosure to provide a technology that reduces a load when a driver operates an operation apparatus.

According to an aspect of the present disclosure, a vehicle user interface system including an operation device, a display device, and a control device, is provided. The operation device is positioned at a position where a driver operates, and inputting multiple operations. The display device displays a display image with using a windshield. The control device controls the display device to display multiple icons, which are selectable by operating the operation device. In a case where a selected icon, which has been selected among the multiple icons displayed by the display device, is distinguishably displayed, the control device controls the display device to display an operation display image and the selected icon. The operation display image indicates one of the multiple operations to which a processing is assigned among the multiple operations.

According to the above vehicle user interface system, it is possible that a load to a driver when the driver operates the operation apparatus is reduced.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Followingly, an embodiment according to the present disclosure will be is explained with reference to drawings.

(Configuration)

Figure 1:
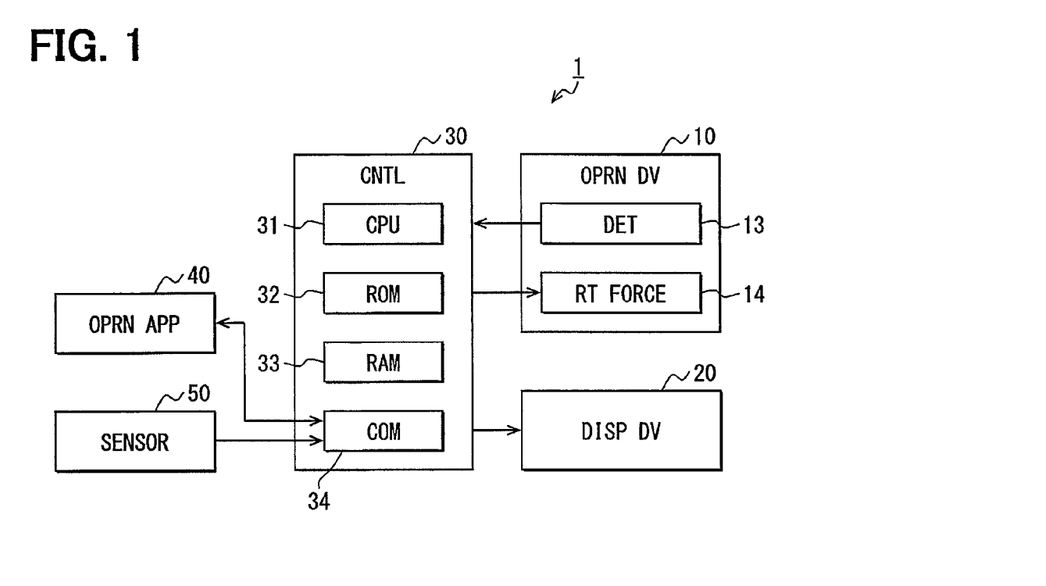
FIG. 1 is a block diagram illustrating a configuration of a vehicle user interface system.

A vehicle user interface system 1 in FIG. 1 is mounted to a vehicle, and includes an operation device 10, and a display device 20 and a control device 30.

The operation device 10 is a device (e.g., a commander) by which a driver of the vehicle inputs multiple operations. The operation device 10 is positioned in a position where the driver operates the operation device 10. Specifically, as described in FIG. 2, the operation device 10 is positioned at one of a right-and-left sides along a vehicle width direction (i.e., a horizontal direction) on a basis of the driver (in other words, a steering 61), the one of the right-and-left sides corresponding to an outer side (in the present embodiment, corresponding to a right side with respect to the steering 61) in the vehicle width direction. Therefore, the operation device 10 is positioned at a position (corresponding to a position only for the driver) where the driver operates the operation device 10 with a hand of the driver of the outer side (i.e., a door side for the driver's seat) in the vehicle width direction. In the present embodiment, so that the driver operates the operation device 10 without changing a driving posture greatly, the operation device 10 is positioned near the position (corresponding to a position of the hand in the driving posture) where the driver holds the steering 61.

Figure 3A:
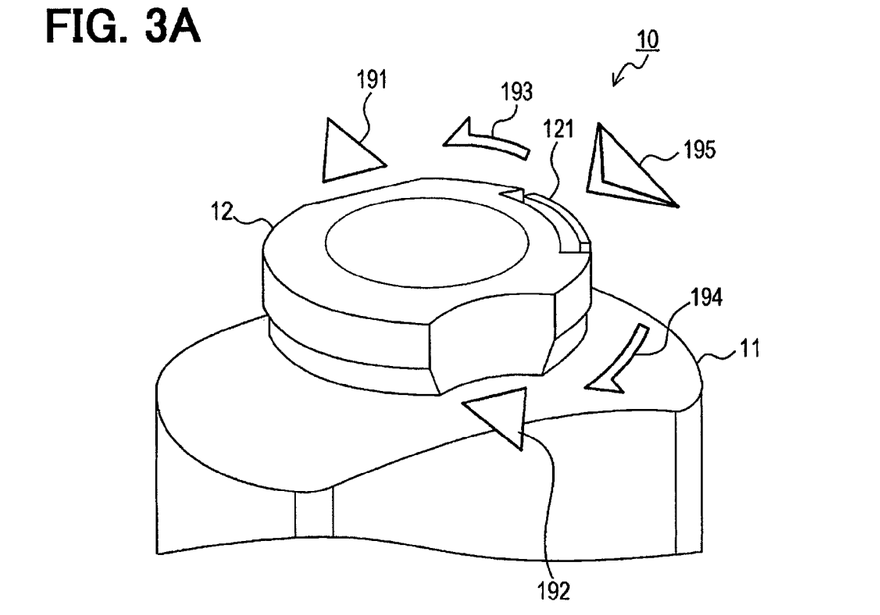
FIG. 3A is a drawing illustrating a perspective view of the operation device.
Figure 3B:
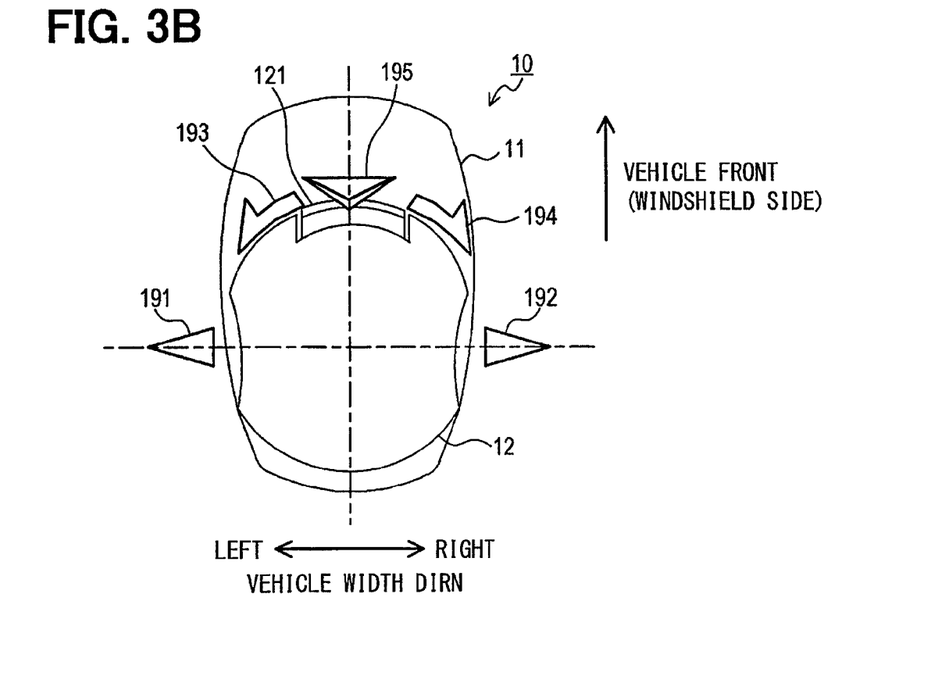
FIG. 3B is a drawing illustrating a plan view of the operation device.

As described in FIG. 3A and FIG. 3B, the operation device 10 includes a base 11, which is fixed to the vehicle, and a movable portion 12, which is movable relatively to the base 11 and is a roughly columnar shape. The movable portion 12 of the operation device 10 performs a left tilt operation and a right tilt operation. In the left tilt operation, an axis direction of the column of the movable portion 12 is tilted in a direction 191 with respect to the base 11, the direction 191 corresponding to a direction tilted to a left side in the vehicle width direction. In the right tilt operation, the axis direction of the column of the movable portion 12 is tilted in a direction 192 with respect to the base 11, the direction 192 corresponding to a direction tilted to a right side in the vehicle width direction. Furthermore, the movable portion 12 of the operation device 10 performs a left rotation operation and a right rotation operation. In the left rotation operation, the movable portion 12 is rotated around the axis direction of the column in a left rotation (i.e., a counterclockwise) direction 193. In the right rotation operation, the movable portion 12 is rotated around the axis direction of the column to a right rotation (i.e., a clockwise) direction 194. The movable portion 12 includes a switch 121 at the upper part of a vehicle front side in a side surface of the roughly column. The switch 121 is pushed into a center direction 195 of the column. Therefore, the operation device 10 performs a push operation, in which the switch 121 is pushed, in addition to the left tilt operation, the right tilt operation, the left rotation operation and the right rotation operation.

As described in FIG. 1, the operation device 10 includes an operation detection portion 13 and a reaction force generation portion 14. The operation detection portion 13 detects the left tilt operation, the right tilt operation, the left rotation operation, the right rotation operation and the push operation, based on a displacement of the movable portion 12 over the base 11 and the displacement of the switch 121. The reaction force generation portion 14 is, for example, an actuator causing the movable portion 12 to generate a reaction force (in the present embodiment, corresponding to vibration). The operation device 10 is a device (i.e., a device including a sense-of-touch feedback function) which performs a notification (i.e., a sense-of-touch notification, or a tactile notification) that the driver feels a sense of touch.

Figure 2:
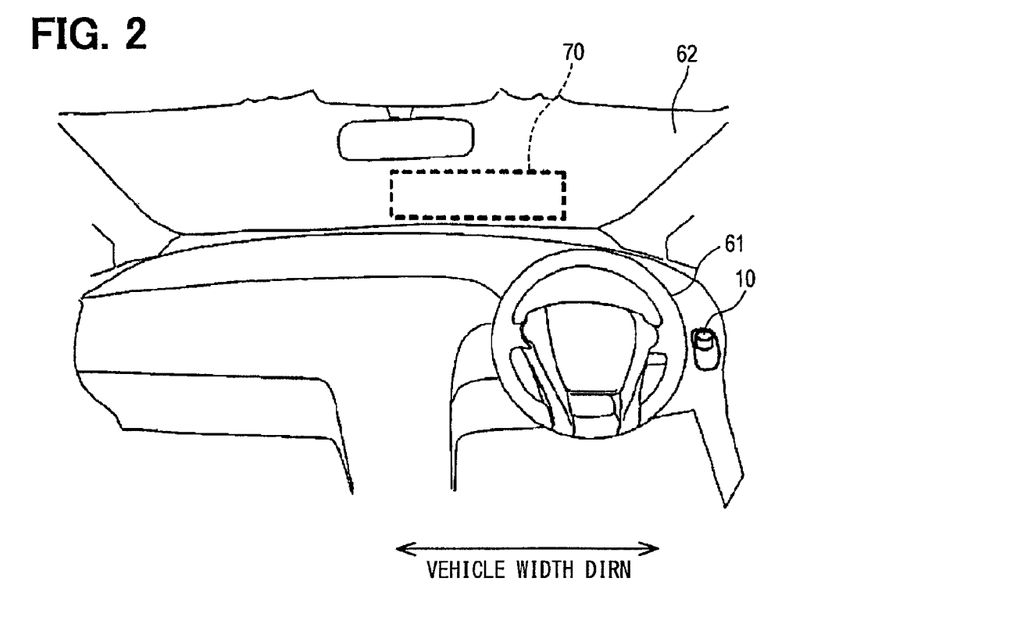
FIG. 2 is a drawing illustrating a position of an operation device or the like in a vehicle cabin.

The display device 20 is a device displaying a display image with using a windshield 62, as described in FIG. 2. The windshield 62 may be referred to as a front glass. The display device 20 is a display device superposing and displaying the display image on a forward visual field (i.e., a driving visual field) of the driver, and corresponds to a so-called head-up display (HUD), for example. Specifically, the display device 20 displays the display image at a position, where the display image is visible for the driver, in front of the driver, and the display image displays the display image on a surface of a virtual image, which is visualized further in front of the windshield 62. Incidentally, a combiner, which is a transparent screen, may be positioned between the windshield 62 and the driver, and the display image may be superposed and displayed on a scenery image outside the vehicle, the scenery being visible through the combiner and the windshield 62.

The control device 30 described in FIG. 1 corresponds to an electronic control unit (ECU), including CPU 31, ROM 32, RAM 33, and a communication portion 34. CPU 31 in the control device 30 performs a processing according to a program stored in a recording medium such as ROM 32 or the like, so that the control device 30 integrally controls the operation device 10 and the display device 20.

For example, as described in FIG. 2, the control device 30 causes the display device 20 to display the display screen 70 so that the driver visually recognizes. The display screen 70 is a horizontally long rectangle, and is positioned in a lower position in the windshield 62. Specifically, as described in FIG. 4A, the display screen 70 is positioned in a position where the display screen 70 crosses a center line 79 (e.g., a center of the driver) of the steering 61 along the vehicle width direction. The center line 79 of the steering 61 is perpendicular to the vehicle width direction.

The display screen 70 is separated into a support information display area 71, a traveling related information display area 72, and a GUI display area 73. In the support information display area 71, a driving support information is displayed. In the traveling related information display area 72, a traveling related information is displayed. In the GUI display area 73, a graphical user interface (GUI) for the operation device 10 is displayed. The display image, which is directly related to the operations used by the operation device 10, is displayed on the GUI display area 73. The GUI display area 73 may correspond to a first display area. On the contrary, the display image, which is not directly related to the operations used by the operation device 10, is displayed on the support information display area 71 and the traveling related information display area 72. The support information display area 71 and the traveling related information display area 72 may correspond to a second display area.

Figure 4B:
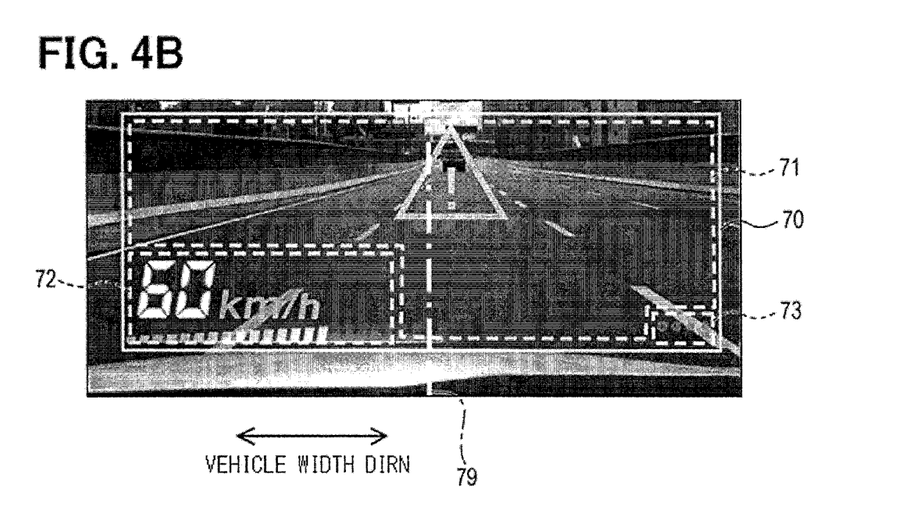
FIG. 4B is a drawing illustrating a display screen of a reduction display mode.
Figure 5:
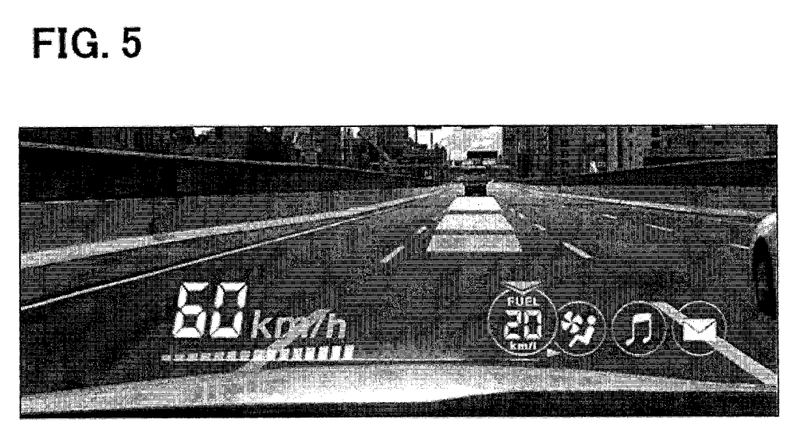
FIG. 5 is a drawing illustrating a display screen while running an adaptive cruise control.

The control device 30 causes the display device 20 to display the driving support information, which supports driving by the driver, on the support information display area 71. In an example of FIG. 4B, a warning mark is displayed when a distance between vehicles becomes short due to a sudden brake of a preceding vehicle. In an example of FIG. 5, in a case where a vehicle control (e.g., an adaptive cruise control (ACC)) following a preceding vehicle is performed, a line is displayed so that the driver or the like intuitively recognize the distance between vehicles. Another example of the driving support information may be a guidance arrow of a navigation device, a marker superposed on a detected pedestrian. Since the driving support information has a high priority, and should be recognized by the driver, the driving support information is positioned at the upper part (corresponding to a position superimposed on an area where the driver gazes while driving) in the display screen 70.

The control device 30 causes the display device 20 to display the traveling related information, which illustrates a traveling state of the vehicle, on the traveling related information display area 72. In the present embodiment, the traveling related information may correspond to information of a traveling speed, a level (i.e., a tachometer) of an engine speed. Another example of the traveling related information may be a position of a shift lever (i.e., a gear lever), or the like. When the traveling related information is compared with the driving support information, a priority for the driver of the traveling related information is low. Therefore, the traveling related information is positioned at the lower part (a position where a visual line movement of the driver during driving becomes large compared with the upper part in the display screen 70) in the display screen 70. However, since the traveling related information may be frequently checked as compared with the GUI for the operation device 10, the traveling related information is positioned at a center side (in the present embodiment, corresponding to a left side) in the vehicle width direction, in which the visual line movement is smaller than a position near the outer side in the vehicle width direction.

The control device 30 causes the display device 20 to display multiple icons as the GUI for the operation device 10 on the GUI display area 73. The multiple icons represent items (e.g., a function or the like), which is selectable by operations with using the operation device 10. Therefore, the vehicle user interface system 1 integrally operates multiple operation apparatuses such as an air conditioning apparatus (e.g., an air conditioner), an audio apparatus or the like, which are mounted to the vehicle, with using the operation device 10 and the display device 20. In addition, the vehicle user interface system 1 is configured to check various information about the vehicle by the display device 20, and to perform a cooperation function (e.g., a transmitting processing, which is cooperated with a smart phone, of an e-mail) with a carrying-in apparatus by using the operation device 10 and the display device 20.

Four icons are arranged laterally in a row on the GUI display area 73, and one (hereinafter, referred to as a selected icon), which is in a selected state, of the four icons is displayed somewhat greatly so that the selected icon is distinguished from the other icons, which are not selected. The selected icon is changed by the operation through the operation device 10. Specifically, when the left tilt operation is performed, an icon, which is located at the left of the selected icon, is changed into the selected icon, and the former selected icon is changed to be displayed normally. When the right tilt operation is performed, an icon, which is located at the right of the selected icon, is changed into the selected icon, and the former selected icon is changed to be displayed normally.

Figure 6A:
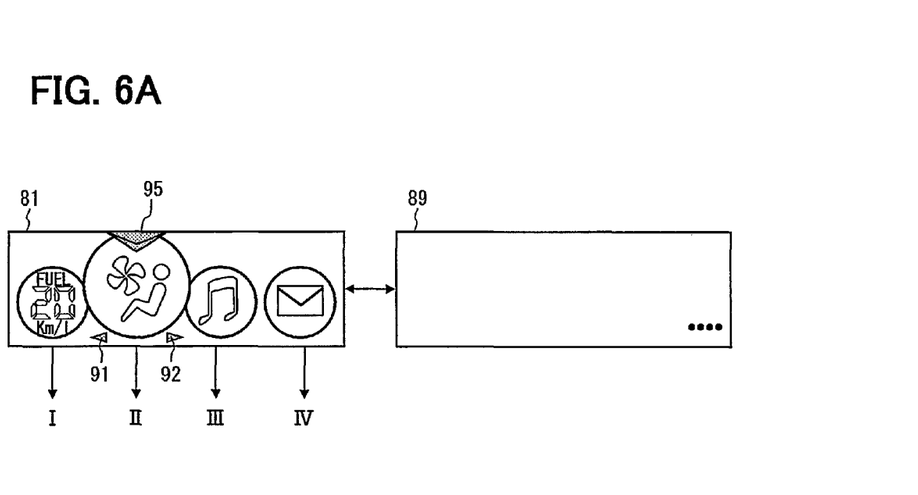
FIG. 6A is a drawing illustrating a first part of a layered structure of icons displayed on the GUI display area.
Figure 6B:
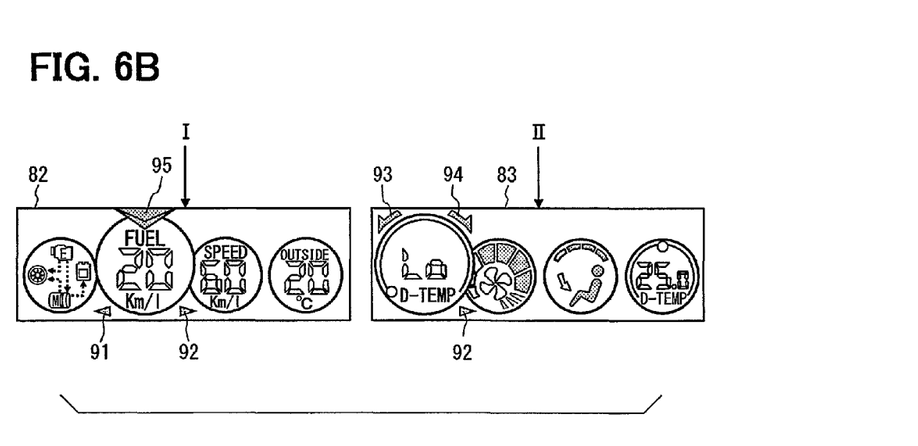
FIG. 6B is a drawing illustrating a second part of the layered structure of icons displayed on the GUI display area.
Figure 6C:
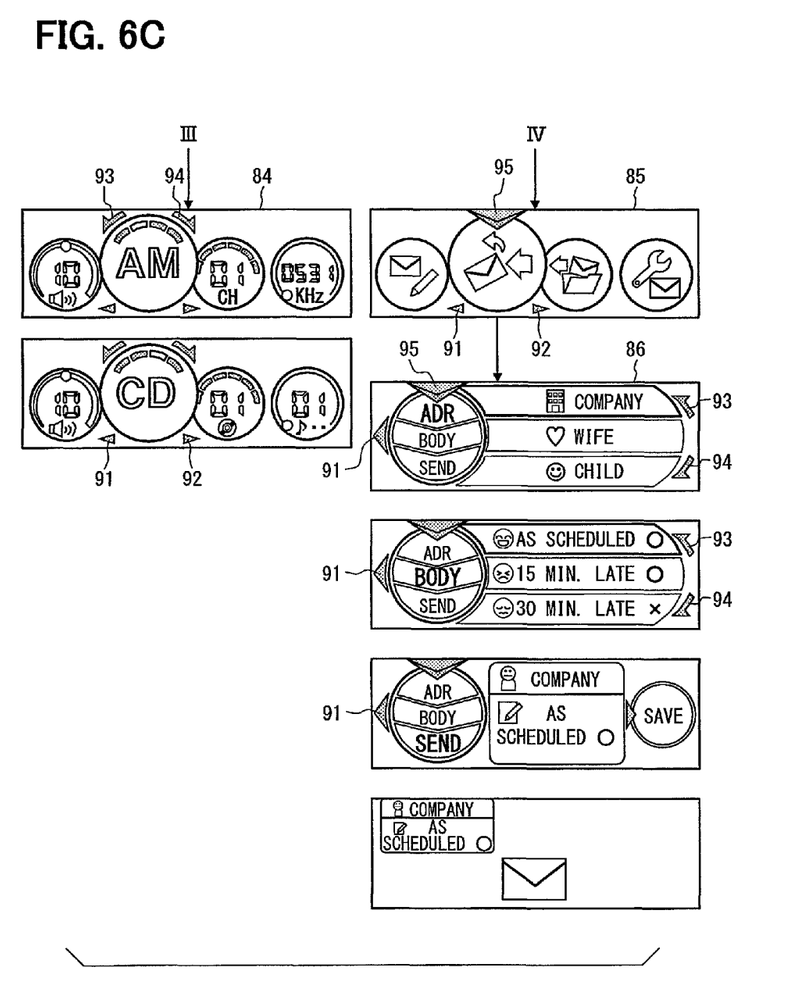
FIG. 6C is a drawing illustrating a third part of the layered structure of icons displayed on the GUI display area.

Furthermore, as described in FIG. 6A to FIG. 6C, the icon displayed on the GUI display area 73 has a layered structure. A multi-information icon, an air-conditioning icon, an audio icon, an e-mail menu icon, and, a mail menu icon are displayed on the menu screen 81 (corresponding to a zero class) sequentially from the left. When the menu screen 81 is displayed, and a confirming operation an the present embodiment, corresponding to the push operation of the switch 121) is performed in a state where the multi-information icon is selected, the menu screen 81 is shifted to the multi-information screen 82 (corresponding to 1st class). On the multi-information screen 82, an energy icon, an average fuel consumption icon, an average speed icon, and an outside temperature icon are displayed sequentially from the left. Similarly, when the menu screen 81 is displayed, and the confirming operation is performed in a state where the air-conditioning icon is selected, the menu screen 81 is shifted to the air-conditioning screen 83 (corresponding to the 1st class). When the menu screen 81 is displayed, and the confirming operation is performed in a state where the audio icon is selected, the menu screen 81 is shifted to the audio screen 84 (corresponding to the 1st class). When the confirming operation is performed in a state where the mail menu icon is selected, the menu screen 81 is shifted a mail menu screen 85 (corresponding to the 1st class). Incidentally, in the audio screen 84, a display mode changes in multiple modes, such as a radio (AM/FM) mode, a CD mode, or the like. Moreover, the mail menu screen 85 further shifts to a screen 86 (for example, a screen for transmitting a fixed form sentence) of a lower layer (corresponding to the 2nd class) according to contents of the operation.

Incidentally, a background color and a display color are not limited to the present embodiment. The background cooler may be transparent, and the display color may be any color.

Depending on the selected icon, various preset values, or the like may be changed by the operation of the left rotation operation, the right rotation operation, or the like. That is, the contents of a processing assigned to the multiple operations are different between each of the icons, the operations being inputted by the operation device 10. Therefore, the control device 30 causes the display device 20 to display the operation display image (corresponding to an arrow) and the selected icon, the operation display image representing that the processing is assigned to the operation among the multiple operations. By displaying the operation display image, the vehicle user interface system 1 according to the present disclosure, the driver may intuitively recognize the contents of the processing which is assigned to each of the multiple operations. The operation display image in the present embodiment includes five kinds, including a left tilt icon 91 illustrating the left tilt operation, a right tilt icon 92 illustrating the right tilt operation, a left rotation icon 93 illustrating the left rotation operation, a right rotation icon 94 illustrating the right rotational operation, and a push operation icon 95 illustrating the push operation of the switch 121.

For example, as described in FIG. 6A to FIG. 6C, in a case where the air-conditioning icon is selected as the selected icon in the menu screen 81, three of the five operation display images: the left tilt icon 91, the right tilt icon 92, and the push operation icon 95, are displayed with the air-conditioning icon. Specifically, the left tilt icon 91 is positioned at a side (corresponding to a left side of the multi-information icon) of the multi-information icon, which is selected by the left tilt operation, and, the right tilt icon 92 is positioned at a side (corresponding to a right side of the multi-information icon) of the audio icon, which is selected by the right tilt operation. The operation display images not displayed represent the operations to which the processing is not assigned in a current displaying state. Incidentally, the operation display image may be displayed as an animation image.

Figure 4A:
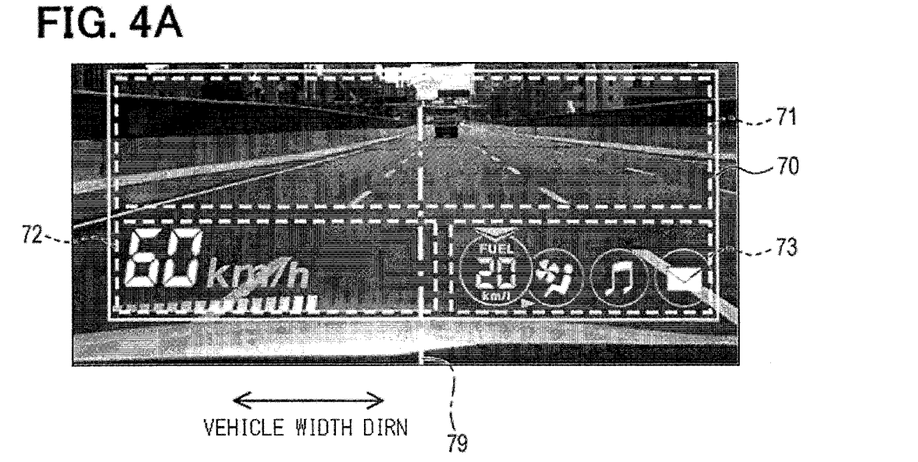
FIG. 4A is a drawing illustrating a display screen of an operating display mode.

As described in FIG. 4A, the GUI display area 73 is positioned at the outer side in the vehicle width direction (in the present embodiment, a right side) in the lower part of the display screen 70. In the present embodiment, the outer side in the vehicle width direction is further from the center position of the vehicle width direction than the center side in the vehicle width direction. In other words, the GUI display area 73 is positioned at the one of a right-and-left sides along the vehicle width direction on a basis of the center line 79 of the steering 61, the one of the right-and-left sides corresponding to the outer side in the vehicle width direction. That is, the GUI display area 73 is positioned and displaced to the same side, where the operation device 10 is positioned at the one of the right-and-left sides over the center line 79 of the steering 61, in a horizontal direction.

The control device 30 changes the display mode of the GUI display area 73 (corresponding to the icon), which is displayed by the display device 20, between the operation display mode and the reduction display mode. The operation display mode corresponds to a first display mode, as described in FIG. 4A. The reduction display mode corresponds to a second display mode, as described in FIG. 4B. A display area (size) of the GUI display area 73 (the icon) in the reduction display mode is smaller than the display domain of the GUI display area 73 in the operation display mode. As described in FIG. 4B, the GUI display area 73 in the reduction display mode is positioned near the lower end of the display screen 70, and positioned near the outer end (e.g., a corner in the display screen 70) in the vehicle width direction. Therefore, the GUI display area 73 in the reduction display mode is displayed small in the position where the field of view of the driver is not prevented. In other words, it is possible that the support information display area 71 may be expanded.

For example, when a predetermined field-of-view secured condition, in which the field of view of the driver should be secured widely, is satisfied, the control device 30 sets the display mode of the GUI display area 73 into the reduction display mode. In the present embodiment, the field-of-view secured condition may correspond to a state (corresponding to a state where the driver should concentrate on driving) where the field of view of the driver should be widely secured, such as a sudden acceleration state, a sudden deceleration state, a abrupt steering state, a state where a distance between vehicles is short, a state where a pedestrian is detected, or the like. Incidentally, the sudden acceleration state or the sudden deceleration state denotes that acceleration or deceleration is more or equal to a predetermined value. The abrupt steering state denotes that a change degree of a steering angle is more or equal to a predetermined value. The state where the distance between vehicles is short denotes that the distance between vehicles is less or equal to a predetermined value.

For example, when the display mode of the GUI display area 73 is the second display mode, and the field-of-view secured condition is not satisfied, the operation with using the operation device 10 is performed. In this case, the control device 30 changes the display mode of the icon from the second display mode to the first display mode.

For example, when the display mode of the icon is the first display mode, and the operation with using the operation device 10 is not performed for more or equal to a predetermined period of time, the control device 30 changes the display mode of the icon from the first display mode to the second display mode.

On the contrary, the control device 30 causes the operation device 10 to perform a predetermined sense-of-touch notification, when, in the predetermined state, a predetermined operation with the operation device 10 is performed. For example, when a certain operation with using the operation device 10 is performed in a state where the field-of-view secured condition is satisfied, the control device 30 causes the operation device 10 to perform a sense-of-touch notification (for example, a notification by vibration of the constant time T1) so that the driver recognizes that the operation is not permitted.

As another example, when an operation of setting up a value which changes gradually, such as numerical increase or decrease, the control device 30 causes the operation device 10 to perform the sense-of-touch notification (for example, a notification by vibration of the constant time T2), so that the driver recognizes one step of the value is changed. The constant time 12 may be shorter than the constant time T1, for example. Herein, a value which changes gradually may be a preset temperature and the amount of winds of the air conditioner, a music number chosen with the audio apparatus, or the like.

For example, when the value changed by the operation reaches a limit value, and the operation to a direction exceeding the limit value is performed, the control device 30 causes the operation device 10 to perform the sense-of-touch notification (for example, a notification by vibration of the constant time T3) so that the driver recognizes that the operation reaches a full limit. The constant time T3 may be longer than the constant time T2. The constant time T1 and the constant time T3 may be equal time.

Incidentally, with respect to the icon (for example, each icon of the air conditioning screen 83) representing the operation of setting up a value gradually, the display image showing the preset value is described as increase or decrease of a scale, for example. In addition, the change of the display image is associated with an operation direction, represented by the operation display image, and therefore it may be possible that a correspondence with the operation direction and the numerical value change is intuitively recognized.

As described in FIG. 1, the communication portion 34 performs communication between the operation apparatuses 40 such as the air conditioner, the audio apparatus, the navigation apparatus, or the like. The communication between the control device 30 and the operation apparatus 40 is performed by LAN inside the vehicle, such as a CAN. However, a communication procedure is not limited in particular.

The communication portion 34 inputs the detection information by various sensors 50, such as the speed sensor, the steering angle sensor, the accelerator sensor, the brake sensor, a G sensor, a corner sensor, a distance-between-vehicles detection sensor, a pedestrian detection sensor, GPS, and an in-vehicle camera, which are mounted to the vehicle. Incidentally, the communication procedure of the sensor 50 is not limited in particular.

(2. Processing)

Figure 7:
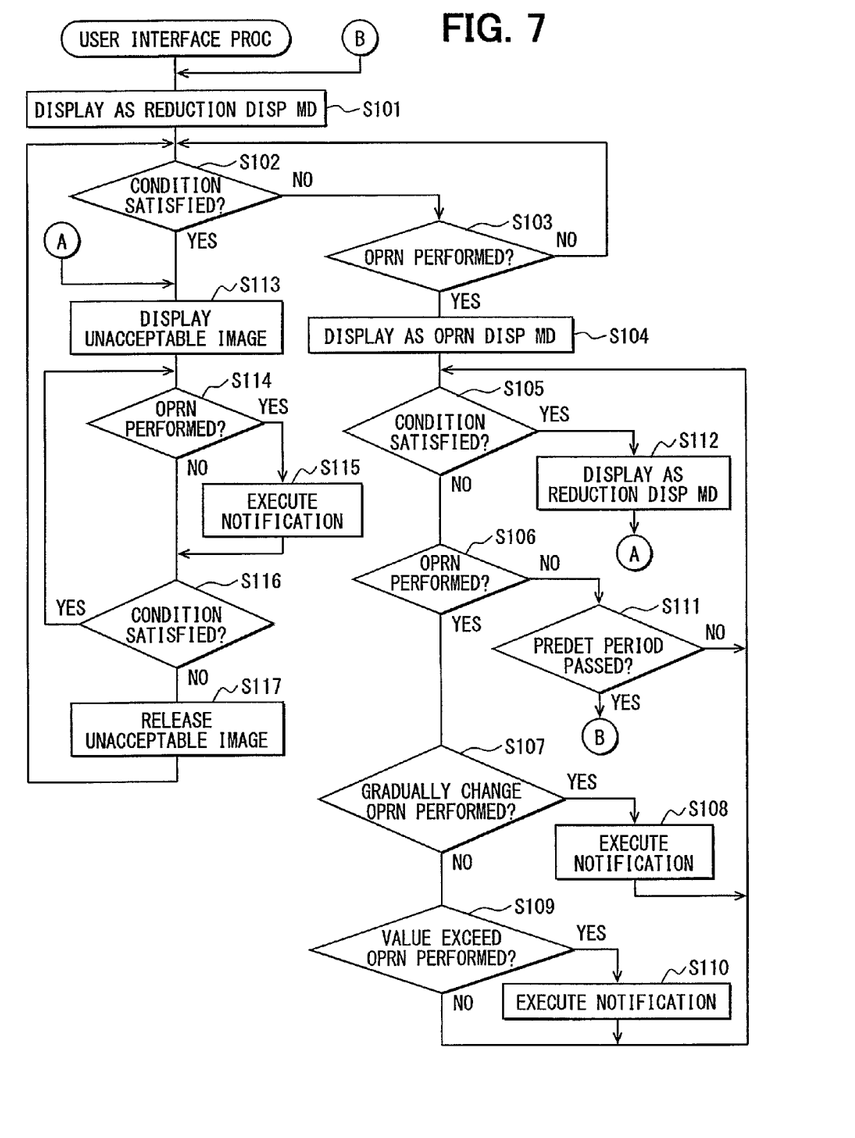
FIG. 7 is a flowchart of a user interface process.

The user interface processing that the control device 30 (specifically the CPU 31) performs according to a program will be explained with reference to a flowchart of FIG. 7. Incidentally, the user interface processing of FIG. 7 is repeatedly executed while an accessory switch of the vehicle is in ON state.

The control device 30 causes the display device 20 to display the display screen 70 in the reduction display mode (S101). Accordingly, as described in FIG. 4B, for example, the display screen 70 is displayed in the display mode where the GUI display area 73 is displayed small.

The control device 30 determines whether the field-of-view secured condition is satisfied (S102). When the control device 30 determines that the field-of-view secured condition is not satisfied (S102: NO), the control device 30 determines whether a certain operation with using the operation device 10 has been performed (S103). When the control device 30 determines that any operation with using the operation device 10 is not performed in S103 (S103: NO), the control device 30 returns the processing to S102.

On the contrary, when the control device 30 determines that the operation with using the operation device 10 has been performed in S103 (S103: YES), the control device 30 causes the display device 20 to display the display screen 70 in the operation display mode (S104). Accordingly, for example, as described in FIG. 4A, the display screen 70 is displayed in the display mode where the GUI display area 73 is displayed large.

The control device 30 determines whether the field-of-view secured condition is satisfied (S105). When the control device 30 determines that the field-of-view secured condition is not satisfied in S105 (S105: NO), the control device 30 determines whether the operation with using the operation device 10 has been performed (S106). When the control device 30 determines that the operation with using the operation device 10 having been performed in S106 (S106: YES), the control device 30 determines whether the operation is a kind of operations of setting up a value which changes gradually, such as an operation with numerical increase or decrease, or the like (S107).

When the control device 30 determines that the operation is a kind of setting up the value which changes gradually in S107 (S107: YES), the control device 30 causes the operation device 10 to perform the sense-of-touch notification (notification by vibration of the constant time T2), so that the driver recognizes that the value is changed in a single step (S108). The control device 30 returns the processing to S105.

On the contrary, when the control device 30 determines that the operation is not performed by setting up the value which changes gradually in S107 (S107: NO), the control device 30 determines whether the operation is a kind of operations to a direction exceeding the limit value (S109). When the control device 30 determines that the operation is a kind of operations to the direction which exceeds the limit value in S109 (S109: YES), the control device 30 causes the operation device 10 to perform the sense-of-touch notification (the notification by vibration of the constant time T3) so that the driver recognizes the value is reached to the limit value (S110). The control device 30 returns the processing to S105.

On the contrary, when the control device 30 determines that the operation is not a kind of operations to the direction which exceeds the limit value in S109 (S109: NO), the control device 30 returns the processing to S105 without performing the sense-of-touch notification. Incidentally, a processing (corresponding to a processing assigned to the operation, and being a change of the display screen, a control of the operation apparatus, or the like) according to the operation detected in S106 is performed as a processing separately from this user interface.

When the control device 30 determines that the operation with using the operation device 10 in S106 (S106: NO), the control device 30 determines whether a state where the operation is not performed has been passed for the predetermined period of time (S111). When the control device 30 determines that the state where the operation is not performed has not been passed for the predetermined period of time (S111: NO), the control device 30 returns the processing to S105.

On the contrary, when the control device 30 determines that the operation has not performed for the predetermined period of time in S111 (S111: YES), the processing returns to S101. Accordingly, the display mode of the display screen 70 is changed to the reduction display mode.

When the control device 30 determines that the field-of-view secured condition is satisfied in S105 (S105: YES), the control device 30 changes the display mode of the display screen 70 into the reduction display mode (S112), and shifts the processing to S113.

On the contrary, when the control device 30 determines that the field-of-view secured condition is satisfied in S102 (S102: YES), the control device 30 shifts the processing to S113.

In S113, the control device 30 causes the display device 20 to display the GUI display area 73 in the reduction display mode and in a gray out manner (representing a state that an operation is unacceptable). That is, a state where the operation using the operation device 10 is not received (or accepted) is emphasized in the display screen 70. Incidentally, instead of the gray out manner, or in addition to the gray out manner, a slant line, a cross mark, or the like may be added to the icon.

The control device 30 determines whether a certain operation with using the operation device 10 has been performed (S114). When the control device 30 determines that the operation with using the operation device 10 has been performed in S114 (S114: YES), the control device 30 causes the operation device 10 to perform the sense-of-touch notification (a notification by vibration of the constant time T1) so that the driver recognizes the operation is unacceptable (S115). The control device 30 shifts the processing to S116.

On the contrary, when the control device 30 determines that the operation with using the operation device 10 is not performed in S114 (S114: NO), the control device 30 skips S115 and shifts to S116.

In S116, the control device 30 determines whether the field-of-view secured condition is satisfied. When the control device 30 determines that the field-of-view secured condition is satisfied in S116 (S116: YES), the control device 30 returns the processing to S114.

On the contrary, when the control device 30 determines that the field-of-view secured condition is not satisfied in S116 (S116: NO), the control device 30 releases the gray out manner (representing a state that the operation is unacceptable) of the GUI display area 73. The control device 30 returns the processing to S102.

(3. Technical Effect)

According to the above embodiment, the following effects will be acquired.

(3A)

In a state where the selected icon is displayed on the head-up display distinguishable, a part of the operation display images 91-95 and the selected icon are displayed on the display device 20, the part of the operation display images 91-95 representing the operation to which the processing is assigned among the operation display images 91-95 (FIG. 6A to FIG. 6C). Therefore, according to the present embodiment, it is possible that the driver of the vehicle checks the icon displayed and the operation to which the processing is assigned by a small visual line movement, and that the driver of the vehicle performs the operation for using many functions by a small posture change. As a result, it is possible to reduce the load to the driver required during a driving, and therefore, to improve safety. Especially, since the icon displayed is displayed as a circular shape, which associates with the movable portion 12 of the operation device 10, it is possible to intuitively recognize the operations, which are described by the operation display images 91-95.

(3B)

The display screen 70 displays (i) the GUI display area 73, in which the multiple icons are displayed, and (ii) the support information display area 71 and the traveling related information display area 72, in which the display image that is directly unrelated to the operation with using the operation device 10 is displayed. The GUI display area 73 is positioned and displaced to the same side, where the operation device 10 is positioned at the one of the right-and-left sides over the center line of the steering 61, in a horizontal direction (referring to FIG. 2, and FIG. 4A). Therefore, according to the present embodiment, it is possible that the driver intuitively recognize a relevance of the operation with using the operation device 10 and the GUI display area 73.

(3C)

The operation device 10 is positioned at the one of the right-and-left sides on the basis of the center of the steering 61, the one of the right-and-left sides corresponding to the outer side in the vehicle width direction (FIG. 2). Therefore, according to the present embodiment, it is possible that the GUI display area 73 is positioned and displaced to the outer side in the vehicle width direction in the display screen 70 and it is possible to secure the view of the driver.

(3D)

The display mode of the icon is changed between the operation display mode and the reduction display mode. In the reduction display mode, the icon is displayed in a small area as compared with the operation display mode. Specifically, when the predetermined field-of-view secured condition, in which the field of view of the driver should be secured widely, is satisfied, the display mode of the icon is in the reduction display mode (S112). Therefore, according to the present embodiment, in a state where the field of view of the driver should be secured widely, it is possible that the area that the icon is displayed is reduced and secures the field of view widely.

(3E)

The operation device 10 performs the sense-of-touch notification, which is recognized by the driver through the sense of touch (or tactile). When the operation device 10 is in the state where the field-of-view secured condition is satisfied, and the operation with using the operation device 10 is performed, the operation device 10 performs the predetermined sense-of-touch notification (S115). Therefore, according to the present embodiment, it is possible that the driver intuitively recognizes the state where the operation should not be operated, for example.

(3F)

When the display mode of the icon is in the reduction display mode, and the state where the field-of-view secured condition is not satisfied, the operation with using the operation device 10 is performed. In this case, the display mode of the icon is changed from the reduction display mode to the operation display mode (S104). Therefore, according to the present embodiment, it is possible that the icon is not displayed greatly usually, that the field of view of a driver is secured widely, and that the icon can be displayed greatly promptly according to a necessity.

(3G)

When the icon is displayed in the operation display mode, and the operation with using the operation device 10 is not performed for the predetermined period of time, the display mode of the icon is changed from the operation display mode to the reduction display mode (S101). Therefore, according to the present embodiment, when displaying the icon greatly is unnecessary, it is possible that the field of view of the driver is secured without performing any operation to the driver.

(4. Another Embodiment)

As described above, the embodiment according to the present disclosure is described. It should be noticed that the present disclosure is not limited to the present embodiment and that the present disclosure has various modifications.

(4A)

The display screen 70 is not limited to the above embodiment. For example, in the present embodiment, the display screen 70 is divided into three areas. Alternatively, the display screen 70 may be divided into two areas, or four or more areas. Alternatively, the display screen 70 may be one area. The information displayed on the display screen 70 is not limited to the information that is exemplified in the present embodiment.

(4B)

In the display screen 70, a timing when the display mode of the GUI display area 73 (i.e., the icon) is not limited to the timing (a condition) exemplified in the present embodiment. For example, the operation display mode may be set as a default display mode, and the operation display mode may be displayed even when the operation has not performed for more or equal to the predetermined period of time. In this case, when the field-of-view secured condition is satisfied, the display mode may be changed to the reduction display mode.

(4C)

The reduction display mode is not limited to the display mode exemplified by the present embodiment. For example, instead of being a size of the GUI display area 73 (i.e., the icon) smaller, or in addition to being a size of the GUI display area 73 (i.e., the icon) smaller, a display color (for example, contrast) of the GUI display area 73 may be changed. Alternatively, instead of the size of the GUI display area 73 being smaller, the GUI display area 73 (corresponding to the icon) may disappear from the display screen 70. Alternatively, in a safe state (e.g., a stop or parking condition, a stably traveling state during the ACC control, a state where another vehicle or the like do not exist around the vehicle, an automatic operation state, or the like), the GUI display area 73 may enlarge (for example, the number of icons displayed is increased).

(4D)

An operation system of the operation device 10 is not limited to the operation system exemplified in the present embodiment. For example, the movable portion 12 may perform a forward tilt operation and a backward tilt operation over the base 11. The forward tilt operation denotes an operation that the axial direction of the column inclines to a vehicle front side, and the backward tilt operation denotes an operation that the axial direction of the column inclines to a vehicle back side. For example, the operation may be detected using a touch panel.

(4E)

The position of the operation device 10 is not limited to the position exemplified in the present embodiment, and may be a position where the driver operates. For example, the position of the operation device 10 may be positioned at a surface or a back surface of the steering 61, a position near the steering 61 in an instrument panel, a door trim, an armrest, or the like.

(4F)

The reaction force generated by the operation device 10 is not limited to vibration exemplified in the present embodiment. For example, the reaction force may be a simple harmonic motion, a continuous vibration, a ruggedness feeling, a click feeling, an increase and decrease of an operating load, a false viscosity, a false friction, a repulsion, a retraction force, or the like.

(4G)

The operation apparatus which the driver performs the operation with using the operation device 10 is not limited to the apparatus exemplified in the present embodiment. For example, the operation apparatus, which the driver operates with using the operation device 10, may be a navigation device. Alternatively, the operation apparatus, which the driver operates with using the operation device 10, may be a mobile device such as a smart phone or the like, and an operation related to a service provided by an external server may be operated by the operation device 10.

(4H)

Alternatively, instead of the visual information by the head-up display and the sense-of-touch notification by the operation device 10, or in addition to the visual information by the head-up display and the sense-of-touch notification by the operation device 10, auditory information by an in-vehicle speaker, a sense-of-touch notification by a steering 61, an accelerator pedal, or a brake pedal may be used, for example. Alternatively, a processing, or the like, based on a voice operation using a speech recognition technology and a visual line detection of the driver may be combined.

(4I)

A function realized by the operation with using the operation device 10 may be realized by the operation by another operation portion (e.g., an operation portion included in the operation apparatus). According to this configuration, another occupant may perform the operation of the operation apparatus.

(4J)

A function included in one component in the present embodiment may be distributed into multiple components, or functions included in multiple components may be integrated into one component. Alternatively, at least a part of the configuration in the present embodiment may be transposed to a well known configuration having the same function. Alternatively, a part of the configuration in the present embodiment may be omitted as long as a subject is solved. Alternatively, at least a part of the configuration in the present embodiment may be added or rearranged with respect to the configuration in another present embodiment. Incidentally, it is noted that all the modes contained within a scope of the technical field specified in the present disclosure correspond to embodiments of the present disclosure.

(4K)

The present disclosure may be realized by various modes, such as the vehicle user interface system 1, the control device 30, a program for operating a computer as the control device 30, a storage medium storing the program, a display method of the display image, or the like.

A vehicle user interface system includes an operation device, a display device, and a control device. The operation device is positioned at a position where a driver operates, and inputs multiple operations. The display device displays a display image with using a windshield. The control device controls the display device to display multiple icons, which are selectable by operating the operation device. Incidentally, a device displaying the display image with using the windshield represents, in other words, a device superposing and displaying the display image on a scenery outside the vehicle, the scenery being visible through the windshield. The device may include a configuration that a transparent screen (a so-called combiner) positioned between the windshield and a driver is separately used, or a configuration that the transparent screen is not used. That is, the vehicle user interface system includes an operation device disposed at a position where a driver operates and inputs multiple operations, a display device displaying a display image using a windshield, and a control device causing the display device to display multiple icons, which are selectable by the operation device. A selected icon is selected from among the multiple icons. The selected icon is distinguishably displayed from among the multiple icons other than the selected icon. One of the multiple operations of the operation device is associated with an operation display image. The control device controls the display device to display the operation display image and the selected icon, so that only the operation display image associated with a processing (or a function) are displayed with the selected icon.

When a selected icon, which has been selected among the multiple icons displayed by the display device, is distinguishably displayed, the control device controls the display device to display an operation display image and the selected icon. The operation display image indicates one of the multiple operations to which a processing is assigned among the multiple operations.

According to this configuration, it is possible that a driver of a vehicle checks the icon displayed and the operation to which the processing is assigned by a small visual line movement, and that the driver of the vehicle performs the operation for using many functions by a small posture change. As a result, it is possible to reduce the load to the driver required during a driving, and therefore, to improve safety.

It is noted that a flowchart or the processing of the flowchart in the present disclosure includes steps (also referred to as sections), each of which is represented, for instance, as S100. Further, each step can be divided into several sub-steps while several steps can be combined into a single step. Furthermore, each of thus configured steps can be also referred to as a device, or module.

Each or any combination of steps explained in the above can be achieved as (i) a software in combination with a hardware unit (e.g., computer) or (ii) a hardware, including or not including a function of a related apparatus; furthermore, the hardware (e.g., integrated circuit, hard-wired logic circuit) may be constructed inside of a microcomputer While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle user interface system comprising:
   a control knob that is disposed at a position where a driver operates and that receives a plurality of operations including a tilt operation, a rotation operation, and a push operation from the driver and that provides the driver with a predetermined sense-of-touch notification recognized through a sense of touch;
   a head-up display that displays a display image on a windshield; and
   a controller that controls the head-up display to display a plurality of icons, which are selectable by the control knob and that changes a display mode of the icons between a first display mode and a second display mode, the icons displayed in the second display mode are displayed smaller than the first display mode, wherein
   when the controller causes the head-up display to display a selected icon, which has been selected from among the plurality of icons, to be distinguishably displayed, the controller causes the head-up display to display an operation display image associated with the selected icon, the operation display image indicating any one of the operations of the control knob to which a processing is assigned,
   the controller causes the control knob to provide a first sense-of-touch notification when the icons are displayed in the first display mode and also when the operation device is operated,
   the controller causes the control knob to provide a second sense-of-touch notification when the icons are displayed in the second display mode and also when the control knob is operated, the second sense-of-touch notification continuing for a time longer than the first sense-of-touch notification,
   when a predetermined field-of-view secured condition, in which a wide field of view of the driver is required, is satisfied, the controller changes the display mode of the plurality of icons into the second display mode, and
   when (i) the display mode of the plurality of icons is in the second display mode, (ii) the predetermined field-of-view secured condition is not satisfied, and (iii) the one of the plurality of operations is performed by the control knob, the controller changes the display mode of the plurality of icons from the second display mode to the first display mode.

2. The vehicle user interface system according to claim 1, wherein
the control device controls the head-up display to display a display screen, the display screen including
a first display area displaying the plurality of icons, and
a second display area displaying the display image directly unrelated to the plurality of operations inputted by the control knob,
the control knob is positioned at one side of a vehicle width direction with respect to a center of a steering wheel, and
the first display area is positioned to the one side of the vehicle width direction along a horizontal direction in the display screen.

3. The vehicle user interface system according to claim 2, wherein
the control knob is positioned to the one side of the right-and-left sides with respect to the center of the steering wheel, and
the one side of the vehicle width direction corresponds to an outer side in the vehicle width direction.

4. The vehicle user interface system according to claim 1, wherein
when (i) the display mode of the plurality of icons is in the first display mode, and (ii) the one of the plurality of operations with using the operation device is not performed for more or equal to a predetermined period of time, the controller changes the display mode of the plurality of icons from the first display mode to the second display mode.

5. The vehicle user interface system according to claim 1, wherein:
the operation display image is displayed and accompanied by the selected icon, or is displayed in a proximity of the selected icon, so that the processing assigned to the operation display image is intuitively recognized by the driver.

6. The vehicle user interface system according to claim 1, wherein:
the control knob is configured to move in a plurality of directions that each correspond to one of the operations of the control knob, which are each indicated by the operation display image.

7. The vehicle user interface system according to claim 6, wherein:
the control knob includes a button that corresponds to one of the operations of the control knob, which is indicated by the operation display image.

8. The vehicle user interface system according to claim 1, wherein:
the controller is configured to cause the head-up display to display a corresponding operation display image for each of the plurality of directions assigned to the selected image in response to the selected image being selected to be distinguishably displayed.

9. The vehicle user interface system according to claim 6, wherein:
the controller is configured to cause the head-up display to display a corresponding operation display image for each of the plurality of directions assigned to the selected image in response to the selected image being selected to be distinguishably displayed.

10. A vehicle user interface system comprising:
a control knob that is disposed at a position where a driver operates and that receives a plurality of operations including a tilt operation, a rotation operation, and a push operation from the driver and that provides the driver with a predetermined sense-of-touch notification recognized through a sense of touch;
a head-up display that displays a display image on a windshield; and
a controller that controls the head-up display to display a plurality of icons, which are selectable by the control knob and that changes a display mode of the icons between a first display mode and a second display mode, the icons displayed in the second display mode are displayed smaller than the first display mode, wherein
when the controller causes the head-up display to display a selected icon, which has been selected from among the plurality of icons, to be distinguishably displayed, the controller causes the head-up display to display an operation display image associated with the selected icon, the operation display image indicating any one of the operations of the control knob to which a processing is assigned,
the controller causes the control knob to provide a first sense-of-touch notification when the icons are displayed in the first display mode and also when the operation device is operated,
the controller causes the control knob to provide a second sense-of-touch notification when the icons are displayed in the second display mode and also when the control knob is operated, the second sense-of-touch notification continuing for a time longer than the first sense-of-touch notification,
the first display mode is an operation display mode,
the second display mode is a reduction display mode,
the controller controls the head-up display to display a display screen that includes a support information display area, a traveling information display area, and a graphical user interface area,
the graphical user interface area of the display screen includes the plurality of icons that are selectable by the control knob,
the controller is configured to determine whether a field-of-view secured condition is satisfied or is not satisfied,
the controller controls the head-up display to display the graphical user interface area to display the operation display mode and the controller controls the head-up display to change from the operation display mode to the reduction display mode without changing the traveling related information display area in response to determining that the field-of-view secured condition is not satisfied,
the controller is configured to control the control knob to provide the second sense-of-touch notification in response to a user operating the control knob while the graphical user interface area displays the reduction display mode to alert a user that operation of the plurality of icons is not permitted during the reduction display mode of the graphical user interface area,
the display screen is a horizontally elongated rectangle displayed on a windshield of a vehicle and the traveling related information display area and the graphical user interface area are located at different corners of the display screen, and
a total display-area of the graphical user interface area in the reduction display mode is smaller than in the operation display mode of the graphical user interface area and the total display-area of the graphical user interface area in the reduction display mode is positioned closer to a corner of the display screen than the total display-area of the graphical user interface area in the operation display mode.

* * * * *